(12) United States Patent
Itabisashi

(10) Patent No.: US 6,424,379 B1
(45) Date of Patent: Jul. 23, 2002

(54) VERTICAL SYNCHRONIZATION SEPARATION CIRCUIT

(75) Inventor: Teruaki Itabisashi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/487,262

(22) Filed: Jan. 19, 2000

(30) Foreign Application Priority Data

Sep. 8, 1999 (JP) .............................................. 11-254899

(51) Int. Cl.[7] .................................................. H04N 5/08
(52) U.S. Cl. ...................... 348/525; 348/521; 348/529; 348/547; 348/705
(58) Field of Search ................................. 348/525, 529, 348/547, 500, 530, 531, 521, 540, 545, 705; 323/317, 282, 271; 327/3

(56) References Cited

U.S. PATENT DOCUMENTS

| | | | | | |
|---|---|---|---|---|---|
| 3,961,360 A | * | 6/1976 | Sato et al. | ..................... | 358/27 |
| 4,463,379 A | * | 7/1984 | Hosoya | ....................... | 348/529 |
| 4,789,896 A | * | 12/1988 | Kishi et al. | .................. | 348/529 |
| 5,229,854 A | * | 7/1993 | Wilber | ....................... | 348/529 |
| 5,345,271 A | * | 9/1994 | Shin | ........................... | 348/525 |
| 5,689,308 A | * | 11/1997 | Nayebi et al. | .............. | 348/529 |
| 5,805,232 A | * | 9/1998 | Ninomiya | ................... | 348/529 |
| 6,028,640 A | * | 2/2000 | Nayebi et al. | .............. | 348/525 |

FOREIGN PATENT DOCUMENTS

| | | |
|---|---|---|
| JP | 4144488 | 5/1992 |
| JP | 4351174 | 12/1992 |
| JP | 7107333 | 4/1995 |

* cited by examiner

*Primary Examiner*—John Miller
*Assistant Examiner*—Jean W. Désir
(74) *Attorney, Agent, or Firm*—Leydig, Voit & Mayer, Ltd.

(57) ABSTRACT

A vertical synchronization separation circuit eliminates distortion in a television picture produced when the synchronization signal is complex and includes a copy guard signal.

9 Claims, 12 Drawing Sheets

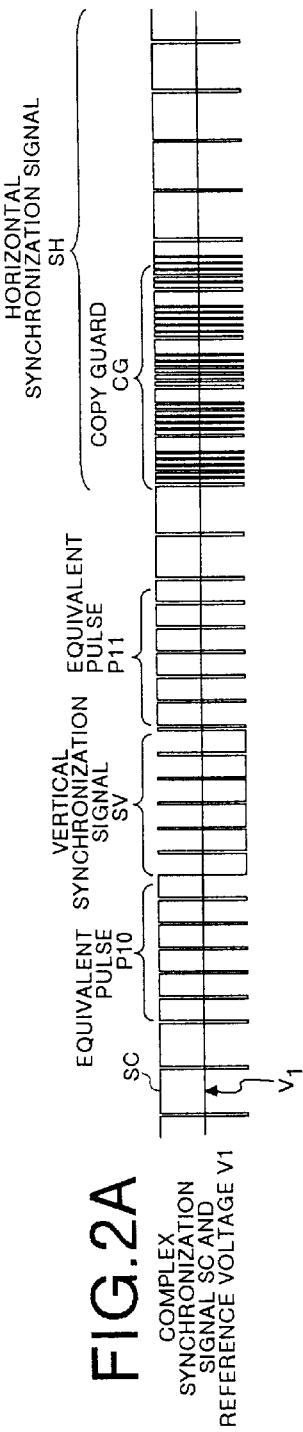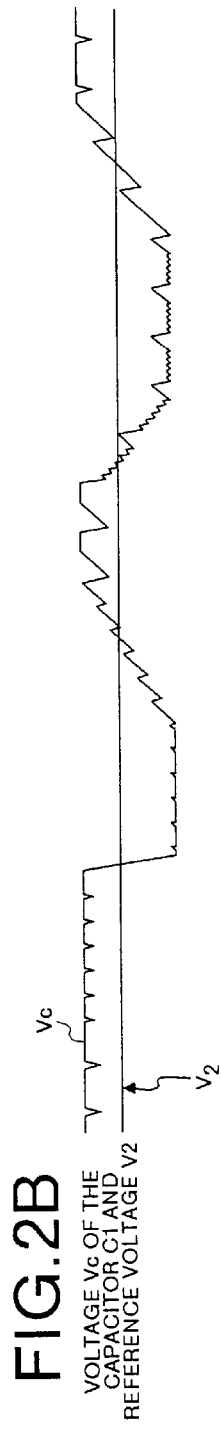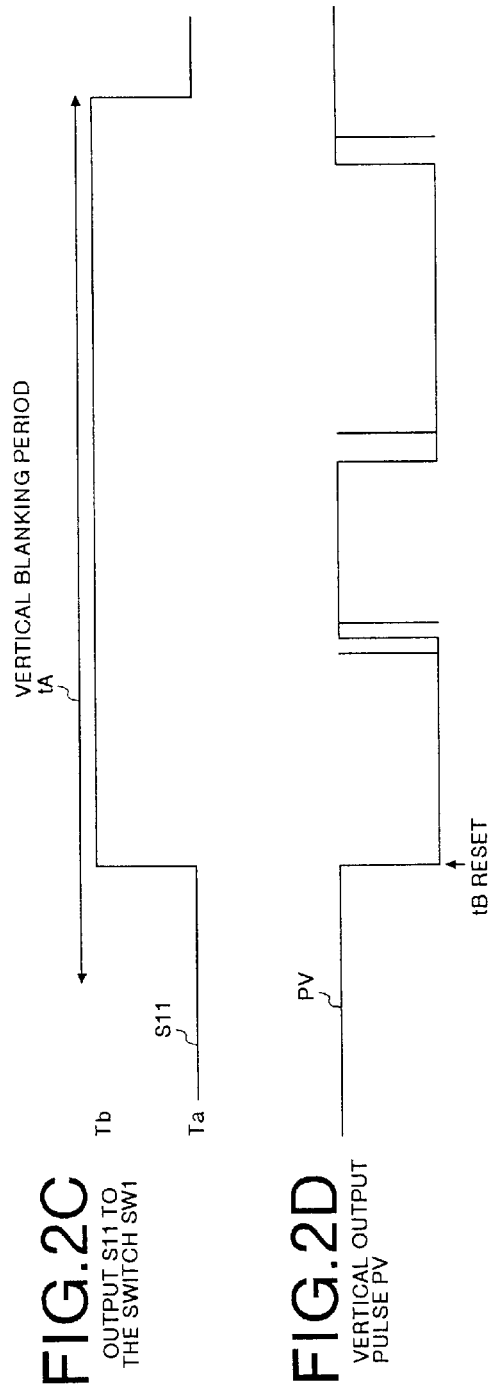
FIG.2A COMPLEX SYNCHRONIZATION SIGNAL SC AND REFERENCE VOLTAGE V1
FIG.2B VOLTAGE Vc OF THE CAPACITOR C1 AND REFERENCE VOLTAGE V2
FIG.2C OUTPUT S11 TO THE SWITCH SW1
FIG.2D VERTICAL OUTPUT PULSE PV

COMPLEX SYNCHRONIZATION SIGNAL SC AND REFERENCE VOLTAGE V1

VOLTAGE Vc OF THE CAPACITOR C1 AND REFERENCE VOLTAGE V2

OUTPUT S11 TO THE SWITCH SW1

VERTICAL OUTPUT PULSE PV

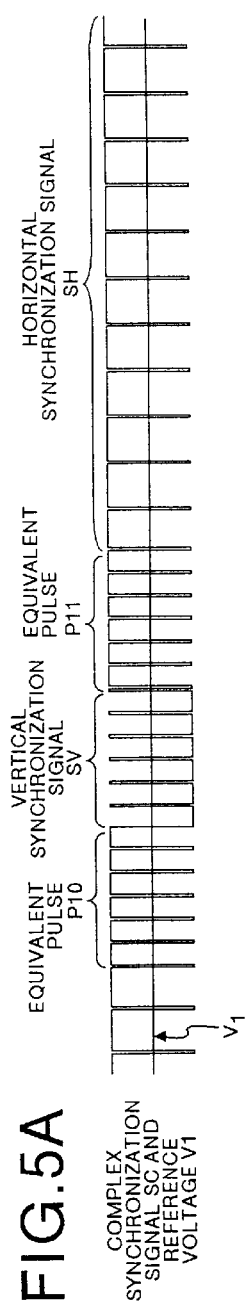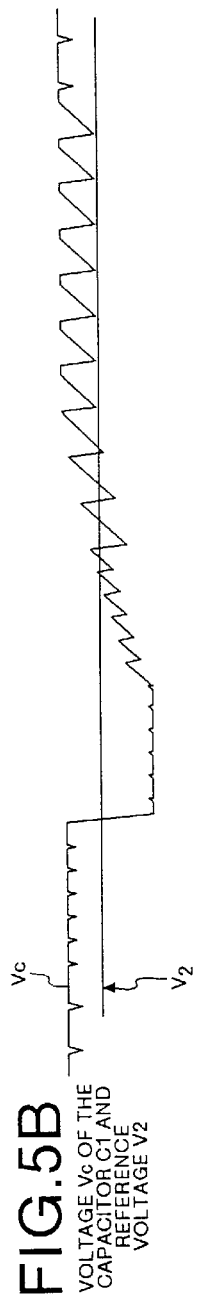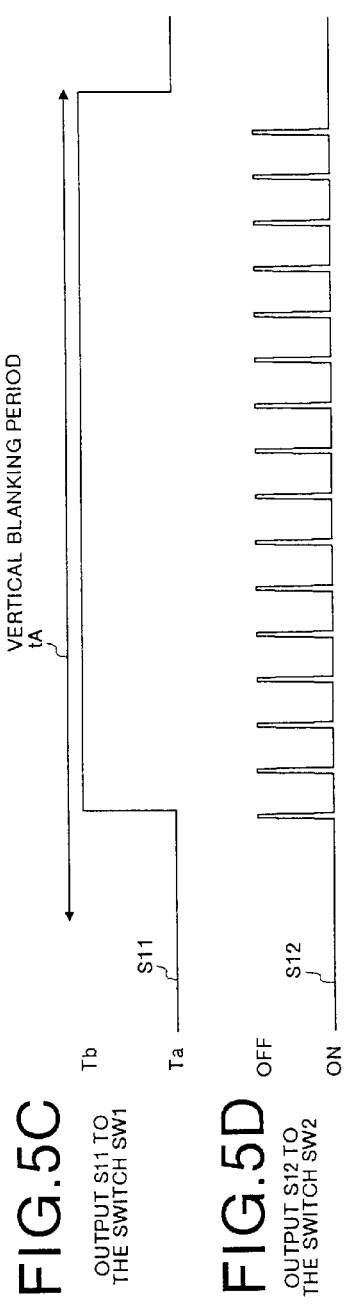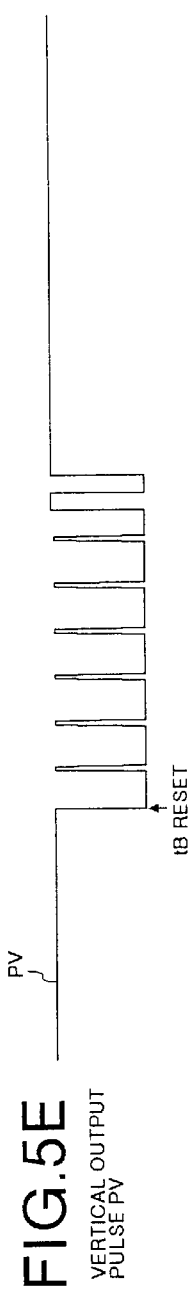
FIG.5A COMPLEX SYNCHRONIZATION SIGNAL SC AND REFERENCE VOLTAGE V1
FIG.5B VOLTAGE Vc OF THE CAPACITOR C1 AND REFERENCE VOLTAGE V2
FIG.5C OUTPUT S11 TO THE SWITCH SW1
FIG.5D OUTPUT S12 TO THE SWITCH SW2
FIG.5E VERTICAL OUTPUT PULSE PV

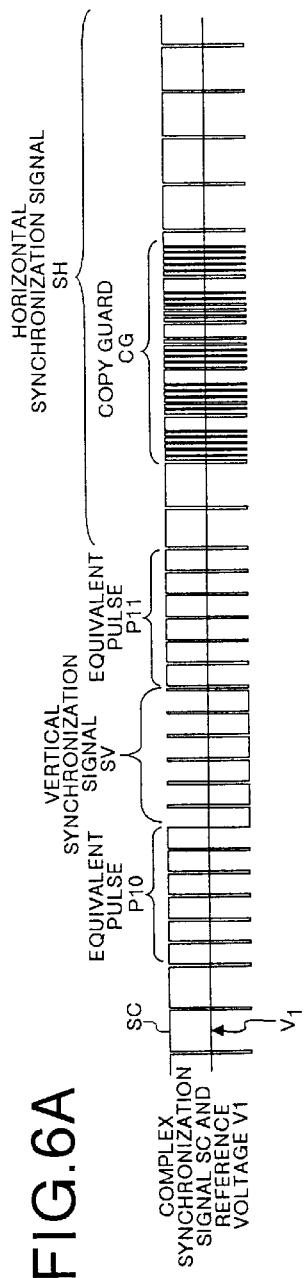
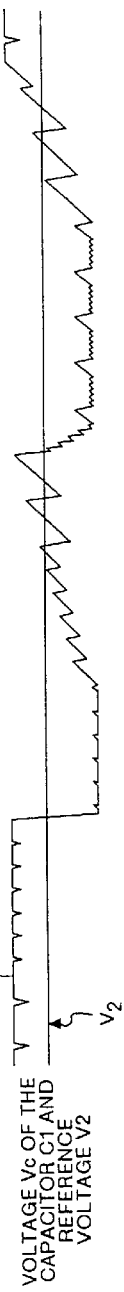
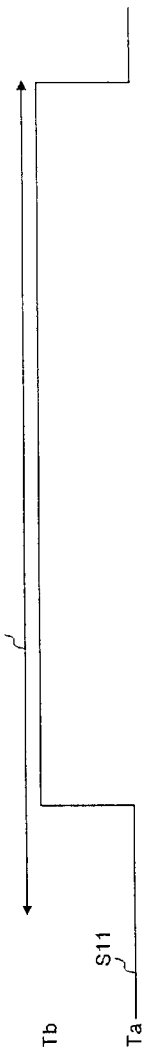
FIG.6A COMPLEX SYNCHRONIZATION SIGNAL SC AND REFERENCE VOLTAGE V1
FIG.6B VOLTAGE Vc OF THE CAPACITOR C1 AND REFERENCE VOLTAGE V2
FIG.6C OUTPUT S11 TO THE SWITCH SW1
FIG.6D OUTPUT S12 TO THE SWITCH SW2
FIG.6E VERTICAL OUTPUT PULSE PV

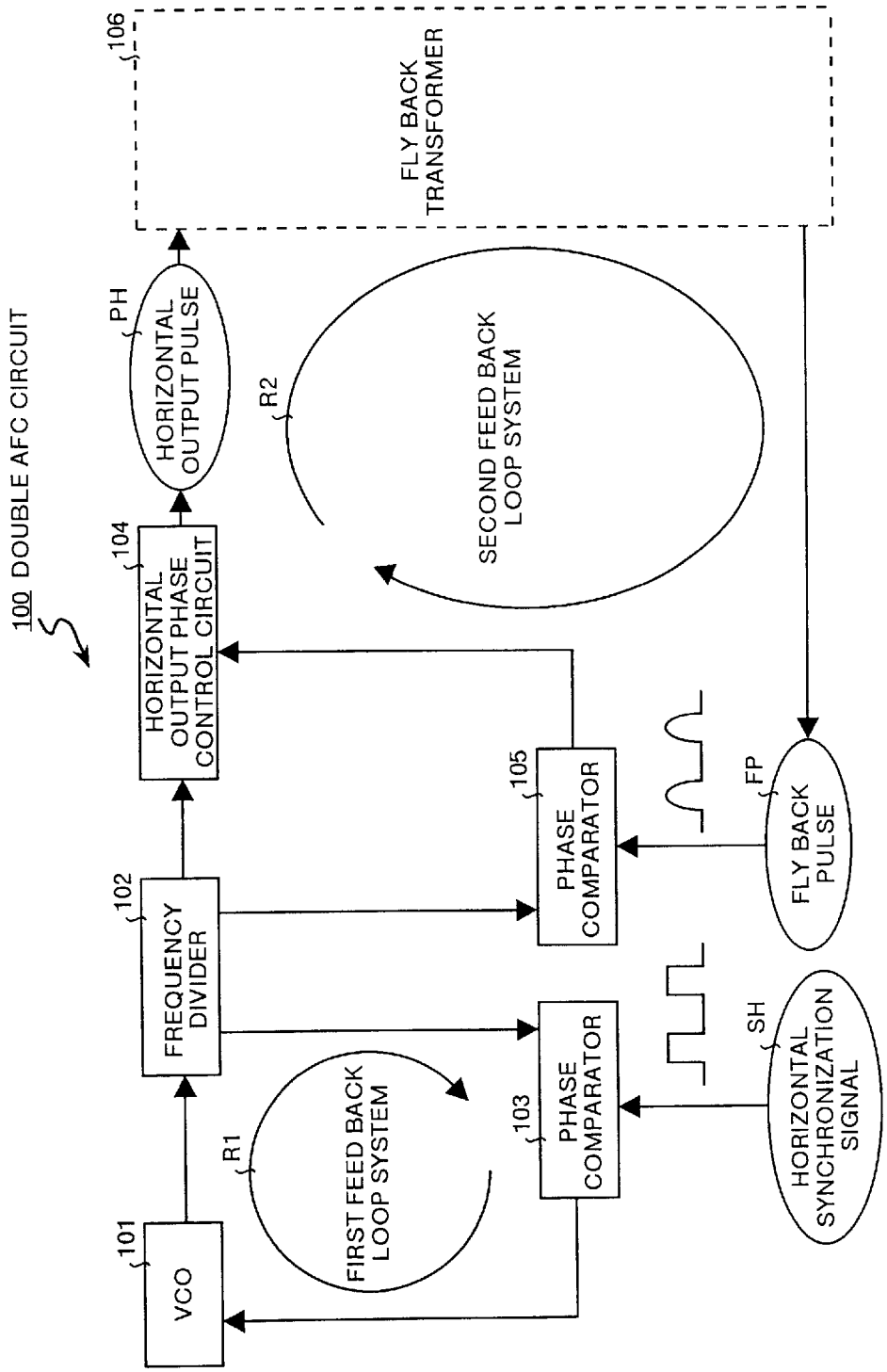

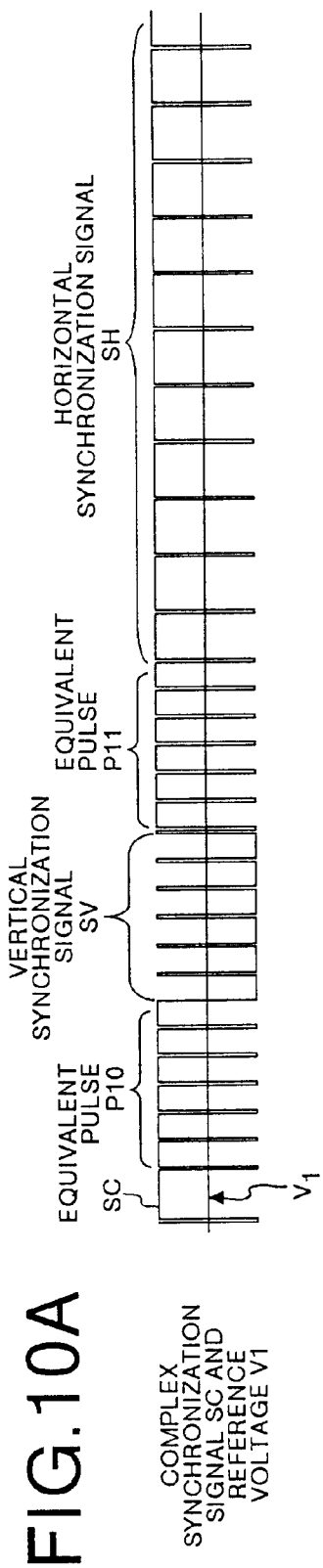
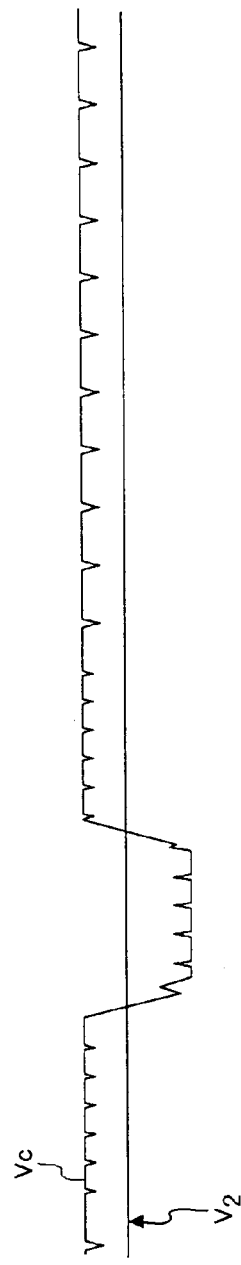
FIG. 10A COMPLEX SYNCHRONIZATION SIGNAL SC AND REFERENCE VOLTAGE V1
FIG. 10B VOLTAGE Vc OF THE CAPACITOR C1 AND REFERENCE VOLTAGE V2
FIG. 10C VERTICAL OUTPUT PULSE PV

COMPLEX SYNCHRONIZATION SIGNAL SC AND REFERENCE VOLTAGE V1

VOLTAGE Vc OF THE CAPACITOR C1 AND REFERENCE VOLTAGE V2

VERTICAL OUTPUT PULSE PV

VERTICAL SYNCHRONIZATION SEPARATION CIRCUIT

FIELD OF THE INVENTION

The present invention relates to vertical synchronization separation circuits which are used in a television (TV) receiver or the like for generating a vertical output pulse based on a complex synchronization signal extracted from an input image signal. More particularly, this invention relates to a vertical synchronization separation circuit which is capable of eliminating a curve on a TV screen by the generation of an appropriate vertical output pulse even in the case where a complex synchronization signal added to a copy guard signal is input.

BACKGROUND OF THE INVENTION

Conventionally, a double AFC (Auto Frequency Control) circuit is used to allow a horizontal synchronization signal to coincide with a TV screen output in the TV receiver. FIG. 7 is a block diagram showing an outline structure of the double AFC circuit. A VCO (Voltage Controlled Oscillator) 101 of a double AFC circuit 100 shown in FIG. 7 oscillates at n times the frequency of the horizontal synchronization signal SH, and this output is input into a frequency divider 102. The frequency divider 102 divides the frequency of the output of the VCO 101 in a cycle of the horizontal synchronization signal SH, and at the same time, generates a signal required for allowing the output of the VCO 101 to coincide with the horizontal synchronization signal SH, and outputs this generated signal to a phase comparator 103. The phase comparator 103 compares the phase of the horizontal synchronization signal SH with the phase of the output of the frequency divider 102, and feeds back and outputs an error voltage corresponding to this phase difference in the result of this comparison to the VCO 101. Consequently, a first feed back loop system R1 is formed with the VCO 101, frequency divider 102, and phase comparator 103. With this first feed back loop system R1, the oscillation frequency of the VCO 101 is locked to the horizontal synchronization signal SH in a definite phase relation. This first feed back loop system R1 generates a horizontal output pulse and stops its operation for the period when the vertical output pulse is output.

On the other hand, the frequency divider 102 further generates a signal which is required for comparing the phase of the output from the frequency divider 102 with the phase of a fly back pulse FP output from a fly back transformer 106, and outputs the generated signal to a phase comparator 105. The phase comparator 105 compares the phase of the output from the frequency divider 102 with the phase of the fly back pulse FP, and outputs an error voltage corresponding to the phase difference in the result of this comparison to the horizontal output phase control circuit 104. The horizontal output phase control circuit 104 generates a horizontal output pulse PH required for preparing the fly back pulse FP, and outputs it to a fly back transformer 106. As described above, the fly back transformer 106 generates the fly back pulse FP, and outputs it FP to the phase comparator 105. Consequently, a second feed back loop system R2 is formed with these phase comparator 105, horizontal output phase control circuit 104, and fly back transformer 106. This second fly back loop system R2 allows the horizontal synchronization signal SH to coincide with the TV screen output. The fly back transformer 106 generates each kind of voltage which is synchronized with the horizontal synchronization signal SH, and also generates a voltage corresponding to the TV screen output. A part of the voltage is then flied back and output to the phase comparator 105 as a fly back pulse FP.

The horizontal synchronization signal SH which is input to this double AFC circuit 100 is output from a synchronizing separation section 110. FIG. 8 is a block diagram showing an outline structure of the synchronizing separation section 110. As shown in FIG. 8, the synchronization separation section 110 outputs the horizontal synchronization signal SH and the vertical output pulse PV from the input image signal S1. The synchronization separation section 110 comprises a synchronization separation circuit 111, a horizontal synchronization separation circuit 112, and a vertical synchronization separation circuit 113. The synchronization separation circuit 111 separates a complex synchronization signal SC in which the horizontal synchronization signal and the vertical synchronization signal exist together from the input image signal S1 and outputs the complex synchronization signal SC to the horizontal synchronization separation circuit 112 and the vertical synchronization separation circuit 113.

The horizontal synchronization separation circuit 112 outputs the horizontal synchronization signal SH, by which an equivalent pulse and a vertical synchronization signal are extracted from the complex synchronization signal SC, to the double AFC circuit 100. On the other hand, the vertical synchronization circuit 113 separates only the vertical synchronization signal from the complex synchronization signal SC and outputs it as a vertical output pulse PV. The operation of the double AFC circuit 100 is suspended if the vertical output pulse PV is output.

FIG. 9 is a circuit diagram showing a detailed structure of the vertical synchronization circuit 113. As shown in FIG. 9, this vertical synchronization separation circuit 113 has a first comparator 11 in which transistors TR1 and TR2 are operated as a differential pair. The first comparator 11 compares the complex synchronization signal SC input from an input terminal T1 with the first reference voltage V1. The input terminal T1 is connected to the base of the transistor TR1 while the positive side of the first reference voltage V1 is connected to the base of the transistor TR2. The power source 1 and the capacitor C1 are connected to a terminal T11 on the collector side of the transistor TR2. The other end of the capacitor C1 is grounded. The other end of the current source 1 and the collector of the transistor TR1 are connected to the power source Vcc. The emitters of the transistors TR1 and TR2 are connected commonly with the power source 3, and grounded. Furthermore, the value of the current I3 which the current source 3 outputs is set to a value larger than the current I1 which the current source 1 outputs.

Consequently, when the first reference voltage V1 is larger than the voltage of the complex synchronization signal SC, an electric load accumulated in the capacitor C1 is discharged because current I3 is larger than current I1. When the first reference voltage V1 is lower than the voltage of the complex synchronization signal SC, the capacitor C1 is charged with the current I1 supplied by the current source 1. Therefore, the voltage Vc that is obtained by the integration of the complex synchronization signal SC is generated in the capacitor C1.

The voltage Vc of this capacitor C1 is applied to the base of the transistor TR3 out of the transistors TR3 and TR4 as differential pairs which constitute the second comparator 12. Furthermore, the second reference voltage V2 is applied to the base of the transistor TR4, and the second comparator 12 compares the voltage Vc and the second reference voltage V2. The collector of the transistor TR3 is connected to the power source Vcc, and the collector of the transistor TR4 is connected to the power source Vcc via a resistor R1. From a connection between the collector of the transistor TR4 and the resistor R1, a vertical output pulse PV is output as a comparison result. Furthermore, the emitters of the transistor TR3 and TR4 are connected commonly with the current source 4, and grounded. Operation of the vertical synchronization separation circuit 113 will be explained by referring to a timing chart shown in FIG. 10A to FIG. 10C. FIG. 10A shows a relation between the complex synchronization signal SC input to the input terminal T1 and the first reference voltage V1. Incidentally, the complex synchronization signal SC shown in FIG. 10A shows a front part of the field. In one field, the complex synchronization signal SC is formed in an order of the equivalent pulse P10 to the vertical synchronization signal SV to the equivalent pulse P11 to the horizontal synchronization signal SH. The complex synchronization signal SC is pulse waveform to assume a negative side (set in a Lo state) to be ON state. In the complex synchronization signal SC, only the vertical synchronization signal SV becomes a wide pulse, compared with the pulse width of other equivalent pulses P10, P11 and horizontal synchronization signal SH.

As a result, as shown in FIG. 10B, the voltage Vc of the capacitor C1 abruptly lowers upon the input of the vertical synchronization signal SV, and becomes smaller than the second reference value V2. Consequently, the vertical output pulse PV is turned on, and the result of the comparison by the second comparator 12 is output for a period during when the vertical synchronization signal SV is input as shown in FIG. 10C. In such a process, the vertical output pulse PV is such that the negative side (Lo) thereof is turned on.

By the way, as shown in FIG. 11A to FIG. 11C, there is a case in which a copy guard signal CG, which is a front part of the vertical synchronization signal SH and is referred to as a micro vision signal during the vertical blanking period, is added to the complex synchronization signal SC. This copy guard signal CG is a signal that is added for preventing a dumping of videotapes. In detail, the copy guard signal CG has a waveform as shown in FIG. 12.

In FIG. 12, one field period, namely the front part of the vertical synchronizing period becomes a twenty-lines section of the vertical blanking period shown by symbols 1̂ to 20. To each of the lines between the line 13 to line 20, a pseudo-synchronization signal SP and a white level signal SW are added so that the copy guard signal CG is formed. The pseudo-synchronization signal SP has a pulse width of 2 μsec while the white level signal SW has a pulse width of 3.7 μsec. Both the pseudo-synchronization signal and the white level signal are repeated five times in an alternate manner respectively. The signal SY is formed only on line 17 and line 18. Setting to which the copy guard signal CG is added and not added is performed to line 20.

When the complex synchronization signal SC added to such a copy guard signal CG is input to the vertical synchronization separation circuit 113, as shown in FIG. 11C, the vertical synchronizing pulse PV similar to the complex synchronization circuit SC to the copy guard signal CG is not added is output. However, the copy guard signal CG is input together with the horizontal synchronization signal SH into the double AFC circuit 100. Accordingly, the phase comparator 103 generates an error voltage corresponding to a phase difference which is different from a comparison with the horizontal synchronization signal SH in order to compare the phase between the copy guard signal CG and the output of the frequency divider 102. As a result, the oscillation frequency of VCO 101 changes, and the frequency of the horizontal output pulse PH, which is output from the horizontal output phase control circuit 104 which receives an output from the frequency divider 102, changes with the result that a curve is generated on the TV screen. In other words, even when the frequency of the horizontal output pulse PH changes in the vertical blanking period, no curve is generated on the TV screen. However, there arises a problem that since the copy guard signal CG is added to the rear part of the vertical blanking period, the copy guard signal CG is responded to, and a change in the error voltage in the double AFC circuit 100 cannot be converged. Therefore, an output on the TV screen is distorted, and a curve is caused in the upper part of the TV screen.

SUMMARY OF THE INVENTION

The present invention has been made in light of the problems described above. It is an object of the present invention to provide a vertical synchronization separation circuit which does not affect the double AFC circuit and which does not generate a curve on the upper part of the TV screen in the case of the separation of the complex synchronization signal to which the copy guard signal is added.

According to a first aspect of the present invention, a switch control unit changes over a first switch to a third current source during a period from the reset of the vertical synchronization up to the termination of the vertical blanking period, and decreases the charge current to the capacitor. Thereby, the detection time of the vertical is quickened, and the vertical output pulse is immediately turned on in the case where the copy guard signal is added to the complex synchronization signal.

Further, the switch control unit generates a control pulse having a timing which covers at least a pulse of the horizontal synchronization signal and a pulse width which is very small as compared to the pulse width of the horizontal synchronization signal in a pulse interval of the horizontal synchronization signal. The switch control unit further carries out a control for turning off a second switch with the control pulse during a period up to the termination of the vertical blanking period.

Other objects and features of this invention will become apparent from the following description with reference to the accompanying drawings.

BRIEF DESCRIPTION OF THE DRAWINGS

FIG. 2A to FIG. 2D are timing charts showing operation of the vertical synchronization separation circuit shown in FIG.

FIG. 5A to FIG. 5E are timing charts showing operation of the vertical synchronization separation circuit shown in FIG. 4;

FIG. 6A to FIG. 6E are timing charts showing operation the vertical synchronization separation circuit shown in FIG. 4 in the case where a copy guard signal is added in the vertical synchronization separation circuit;

FIG. 7 is a block diagram showing an outline structure of the double AFC circuit;

FIG. 10A to FIG. 10C are timing charts showing operation of the vertical synchronization separation circuit shown in FIG. 9;

DESCRIPTION OF THE PREFERRED EMBODIMENTS

Preferred embodiments of the vertical synchronization separation circuit according to the present invention will be explained in the following by referring to the accompanied drawings.

Figure 1:
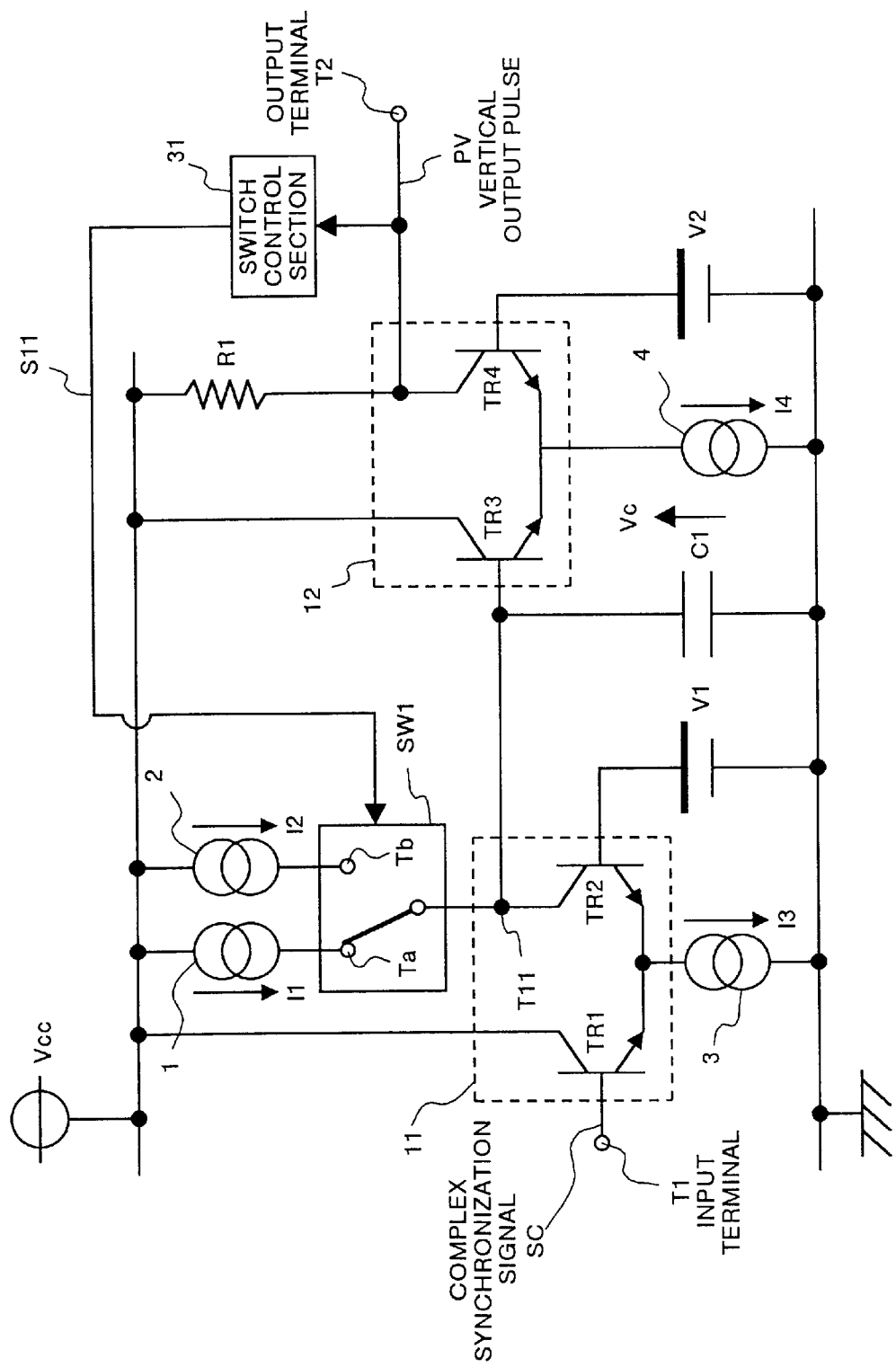
FIG. 1 is a circuit diagram showing a structure of a vertical synchronization separation circuit diagram according to a first embodiment of the present invention.
Figure 9:
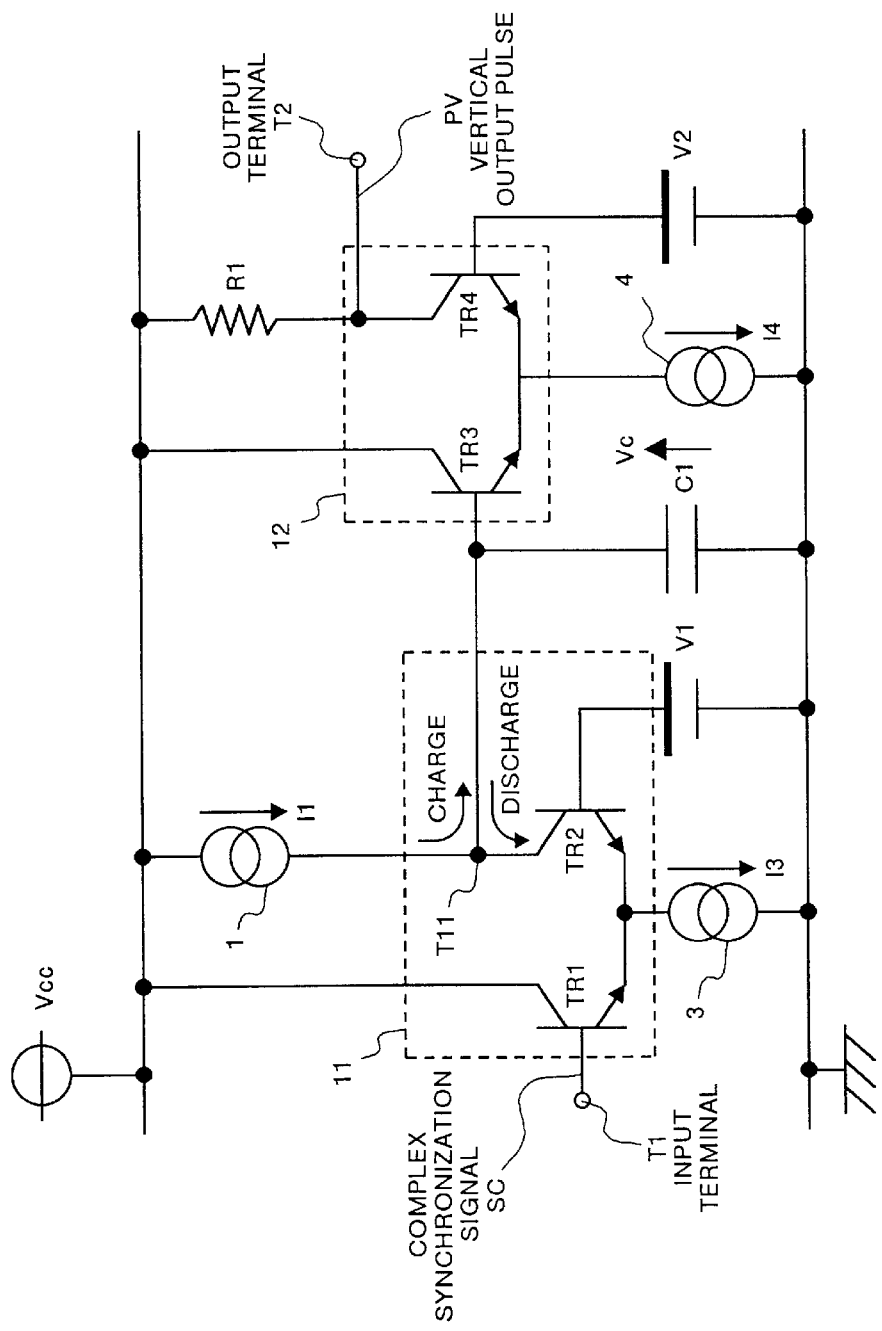
FIG. 9 is a circuit diagram showing a structure of a conventional vertical synchronization separation circuit.

In the beginning, a first embodiment of the present invention will be explained. FIG. 1 is a circuit diagram showing a structure of the vertical synchronization separation circuit according to the first embodiment of the present invention. The vertical synchronization separation circuit shown in FIG. 1 replaces the current source 1 of the vertical synchronization separation circuit shown in FIG. 9 with current sources 1 and 2 and a switch SW 1 for changing over and outputting the current sources 1 and 2. A switch control section 31 for changing over and controlling this switch SW1 is newly provided. Other structure is the same as the vertical synchronization circuit shown in FIG. 9, and the same constitution sections are denoted by the same reference numerals.

As shown in FIG. 1, the current sources 1 and 2 are connected to the power source Vcc while the other terminal is connected to the terminals Ta and Tb of the switch SW1 respectively. The switch SW1 changes over the switch SW1 under the control of the switch control section 31, and outputs either the current I1 which the current source 1 outputs or the current I2 which the current source 2 outputs to the node T11. The current I2 which the current source 2 outputs is set to a small value compared with the current I1 which the current source 1 outputs. Furthermore, in the same manner as the vertical synchronization separation circuit shown in FIG. 9, the current I3 which the current source 3 outputs is set to a large value compared with the current I1 which the current source 1 outputs.

A switch control section 31 monitors the vertical output pulse PV. The switch control section 31 connects the terminal Tb to the switch SW1 at a time point when the vertical synchronization signal SV is recognized, that is, during the period from time point of the reset tB of the vertical synchronization to the termination of the vertical blanking period tA. As a result, a control for allowing the current I2 which the current source 2 outputs to flow into the node T11 is carried out. In other words, the output S11 shown in FIG. 2C is output to the switch SW1. The end of the vertical blanking period tA can be notified by the system, or can be measured with a timer or the like.

Operation of the vertical synchronization separation circuit shown in FIG. 1 will be explained here by taking concrete values for the currents I1 through I4 set by the current sources 1 through 4. In other words it is assumed that the current I1 which the current source 1 outputs is about 20 $\mu$A, the current I2 which the current source 2 outputs is about 5 $\mu$A, the current I3 which the current source 3 outputs is about 35 $\mu$A, and the current I4 which the current source 4 outputs is about 35 $\mu$A. Further, the capacitance of the capacitor C1 is about 50 pF.

When the switch SW1 is connected to the current source 1 and the voltage Vc of the input complex synchronization signal Sc is higher than the first reference voltage V1, the capacitor C1 is charged by the current of 20 $\mu$A. However, when the voltage Vc of the input complex synchronization signal SC is low compared with the first reference voltage V1, the capacitor C1 is discharged by the current of 15 $\mu$A. On the other hand, when the switch SW1 is connected to the current source 2, and the voltage Vc of the input complex synchronization signal SC is high compared with the first reference voltage V1, the capacitor C1 is charged by the current of 5 $\mu$A. When the voltage Vc of the input complex synchronization signal SC is low compared with the first reference voltage V1, the capacitor C1 is discharged by the current of 30A. Consequently, when the current source is switched to the current source 2, the discharge current to the capacitor C1 decreases, and then the discharged current increases. Therefore, the detection time of the vertical synchronization is quickened.

Figure 8:
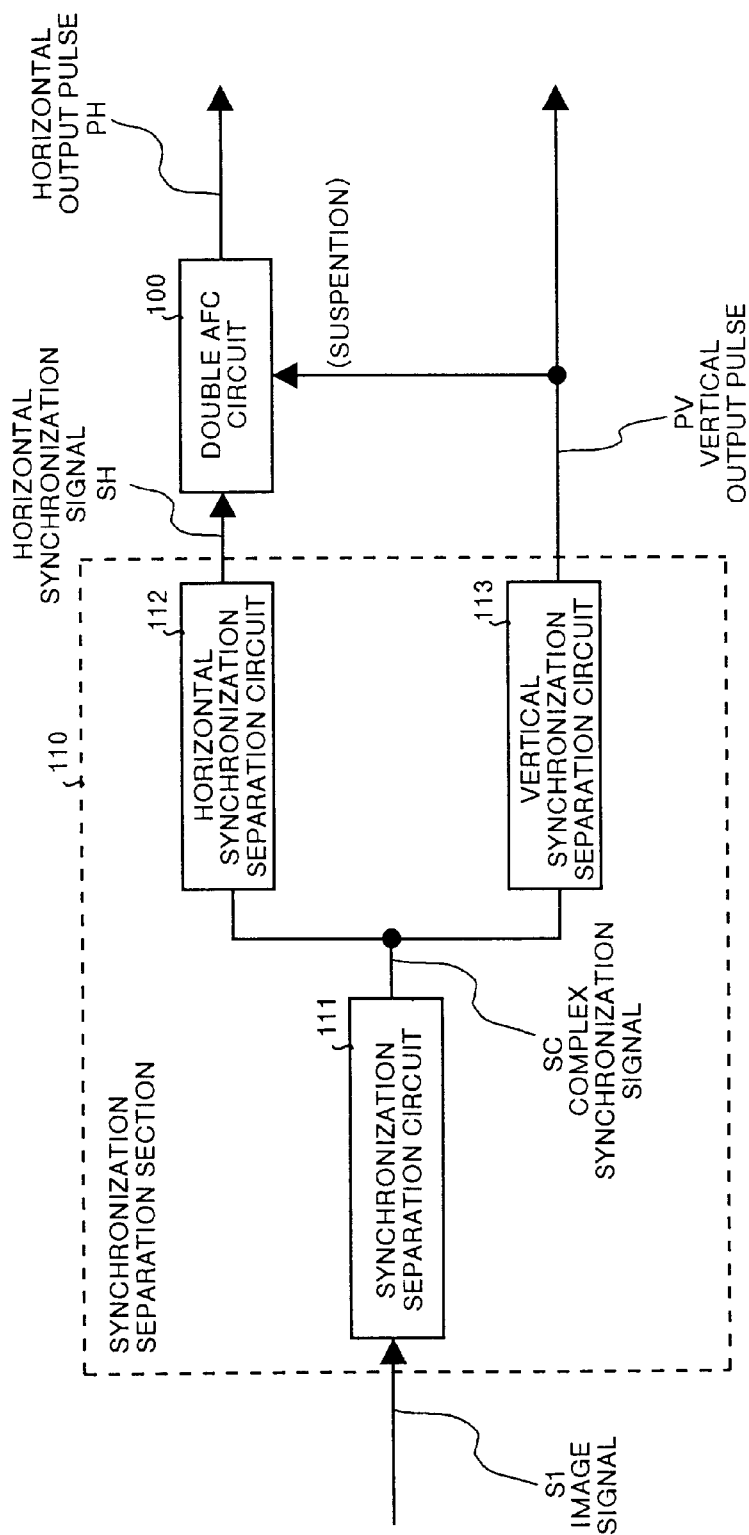
FIG. 8 is a block diagram showing an outline structure of the synchronizing separation section.
Figure 11A:
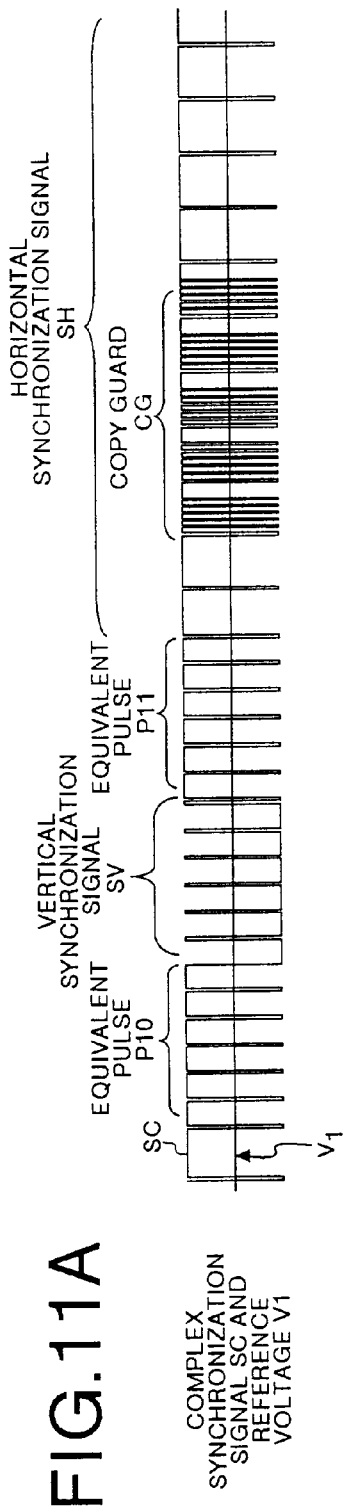
FIG. 11A to FIG. 11C are timing charts showing operation of the vertical synchronization separation circuit shown in FIG. 9 in the case where the copy guard signal is added.
Figure 11B:
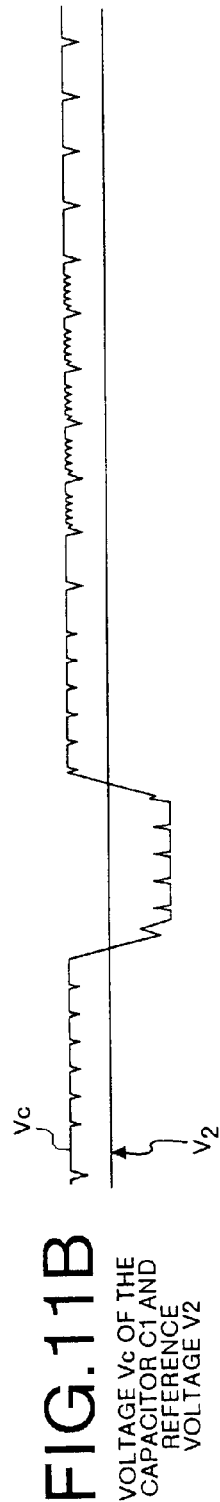
Figure 11C:
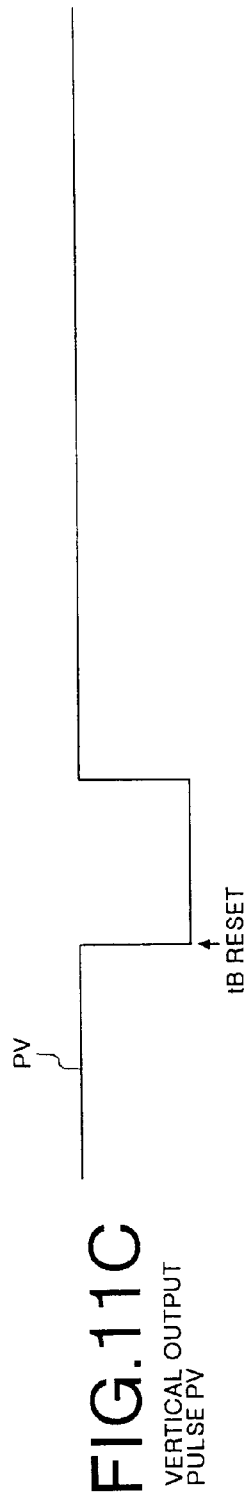
Figure 12:
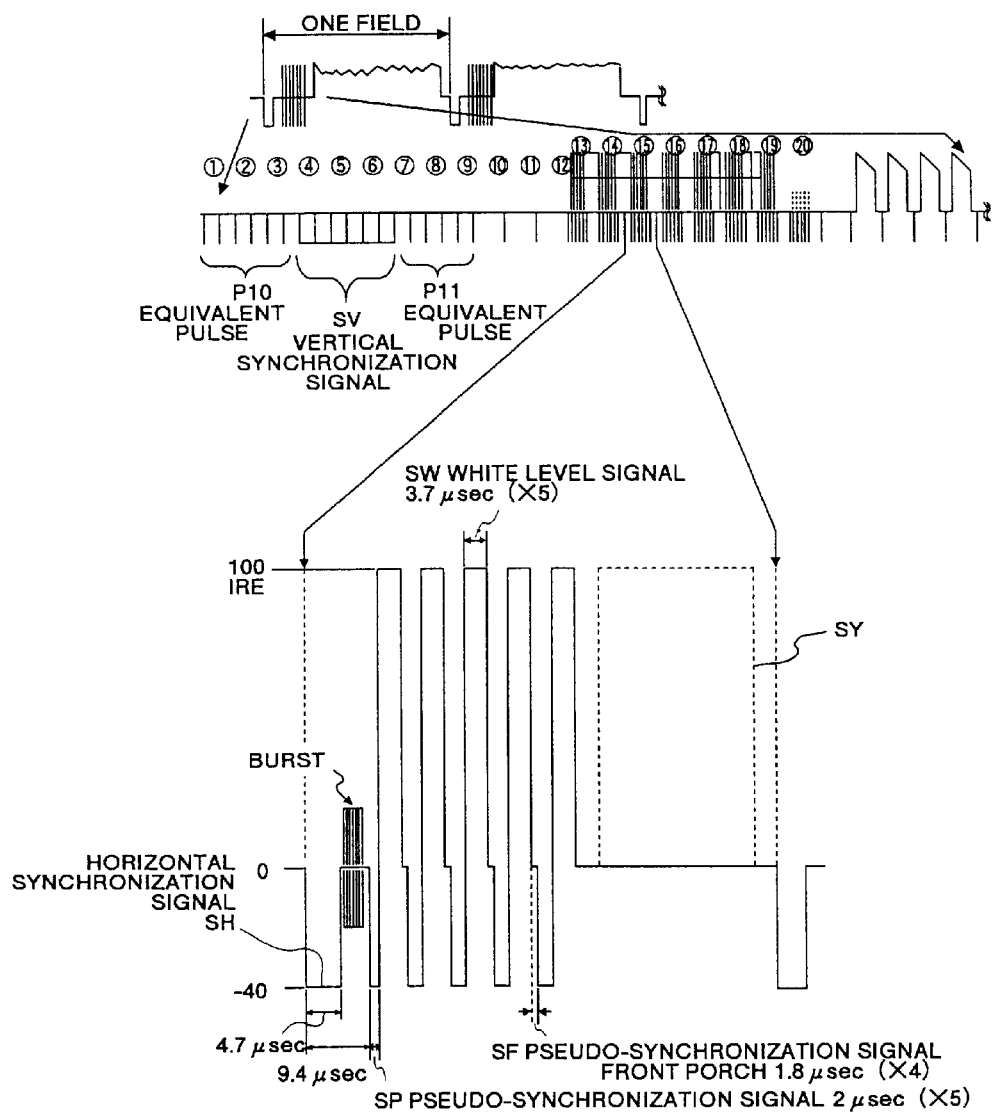
FIG. 12 is a view showing details of the copy guard signal.

In the conventional vertical separation circuit, as can be seen in the case of the voltage Vc of the capacitor C1 shown in FIG. 11B, the voltage does not lower than the second reference voltage V2 at the copy guard signal CG. However, as shown in FIG. 2B, the voltage Vc of the capacitor C1 lower than the second reference voltage V2 according to the first embodiment of the present invention. As shown in FIG. 2D, at the time of the processing of the copy guard signal CG, the vertical output pulse PV is turned on. When the vertical output pulse PV is turned on, the operation of the double AFC circuit is suspended as shown in FIG. 8. Since the double AFC circuit holds the AFC voltage during this suspension period, the frequency of the double AFC circuit is not disordered with the copy guard signal CG. Consequently, even in the case where the complex synchronization signal SC to which the copy guard signal CG is added is input, the double AFC circuit is operated in a normal state after the termination of the vertical blanking period tA. Therefore, curve is not caused in the TV screen output.

In first embodiment a case is explained in which a control is provided in such a way that the current source 2 is utilized during the period from the reset tB of the vertical synchronization up to the termination of the vertical blanking period tA. However, it is needless to say that, the current source 2 may be utilized during any of the period, from the end of the vertical synchronization signal SV up to the termination of the vertical blanking period tA, from the reset tB of the vertical synchronization up to termination of the copy guard signal CG, or the end of the vertical synchronization signal SV up to the termination of the copy guard signal CG.

Further, according to the first embodiment of the present invention, the switch control section 31 changes over the switch SW1 to the current source 2 during the period from the reset tB of the vertical synchronization up to the termination of the vertical blanking period tA decreases the charged current to the capacitor C1. Thereby, the detection time of the vertical synchronization is quickened. When the copy guard signal CG is added to the complex synchronization signal SC, the vertical output pulse PV is immediately turned on. As a result, the operation of the AFC circuit which generates the horizontal output pulse on the basis of the horizontal synchronization signal SH is suspended with the turn on of the vertical output pulse PV and the AFC voltage is held. Thus, even in the case where the copy guard signal CG is added, the AFC voltage is not changed due to the addition of the copy guard signal CG, and disorder is also not caused. Then, after the termination of the vertical blanking period tA, the AFC circuit is immediately operated in a normal state, and a curve caused by the copy guard signal CG is not generated in the TV screen output.

Figure 4:
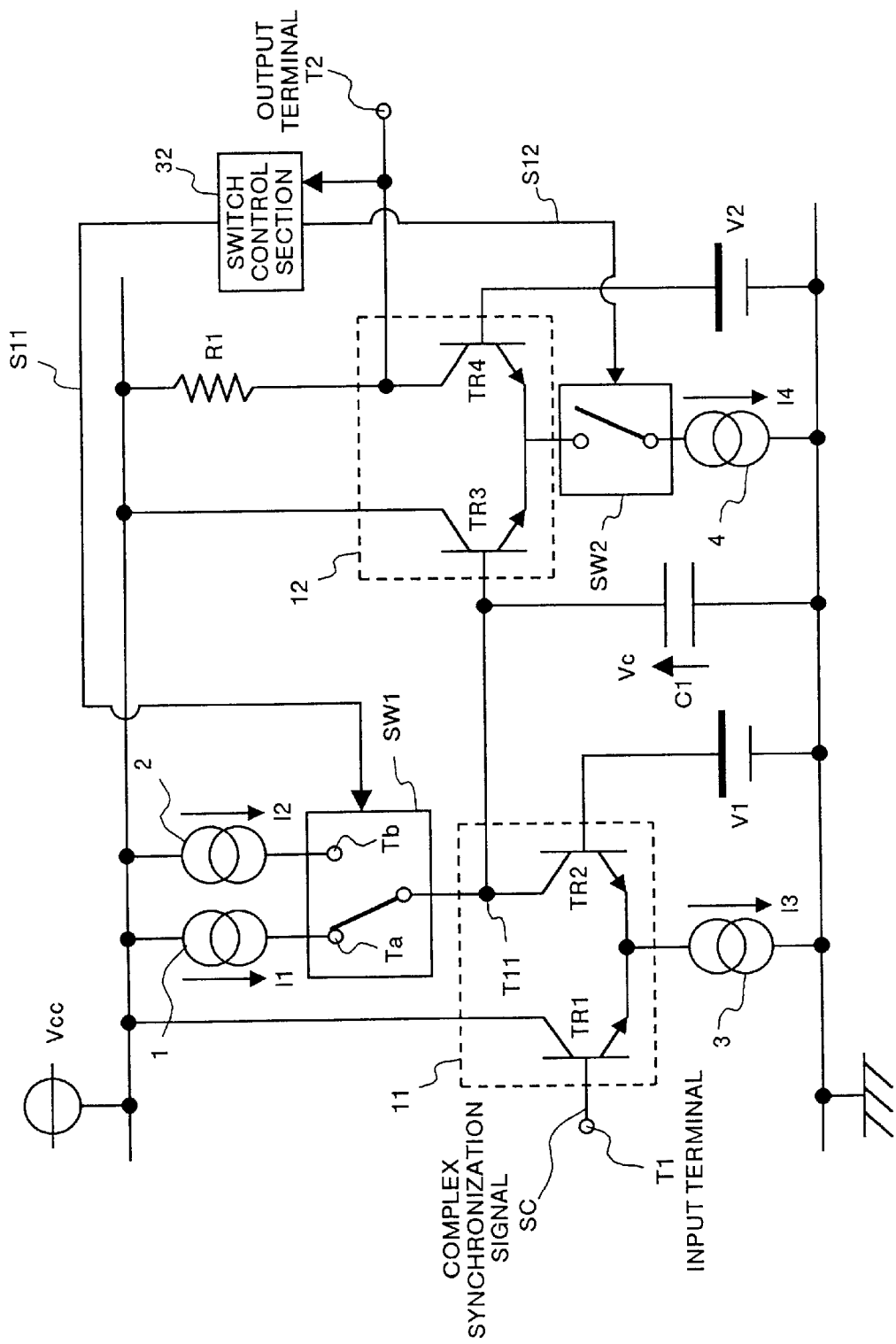
FIG. 4 is a circuit diagram showing a structure of the vertical synchronization separation circuit according to a second embodiment of the present invention.

A second embodiment of the present invention will be explained below. FIG. 4 is a circuit diagram showing a structure of the vertical synchronization separation circuit according to the second embodiment of the present invention. In the first embodiment, the charged current to the capacitor C1 is decreased by changing over the current source 2 which outputs the current I2 which is small compared with the current I1 during the period from the reset tB of the vertical synchronization to the termination of the vertical blanking period tA. As a result, the detection time of the vertical synchronization is quickened. Thus, when the copy guard signal CG is added, in the first embodiment, the vertical output pulse PV is immediately turned on by detecting the copy guard signal CG, and the double AFC circuit is suspended. Therefore, the double AFC circuit is allowed to start in a normal state immediately after the termination of the vertical blanking period tA. However, when the switch SW1 is changed over to the current source 2, the current source 2 does not necessarily output the current I2 of the same value. In other words, a non-uniformity might be caused in the value of the current I2 which the current source 2 outputs by the non-uniformity in the wafer process at the time of the manufacture of the current source, or by the temperature characteristics.

Figure 3A:
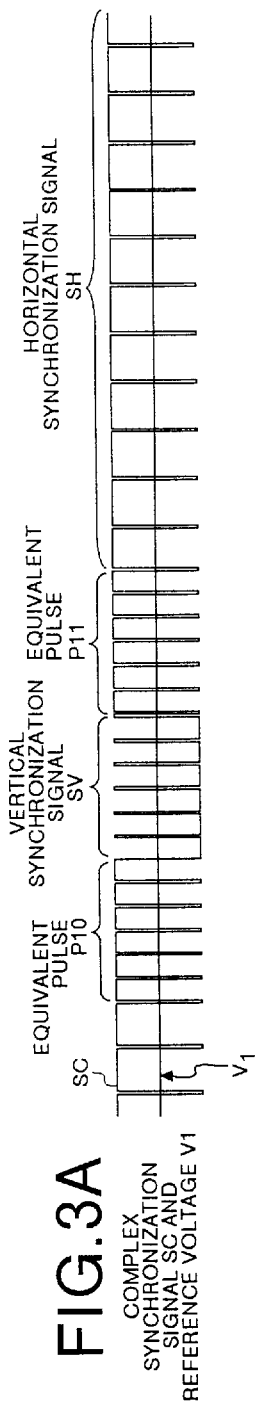
FIG. 3A to FIG. 3D are timing charts showing operation of the vertical synchronization separation circuit shown in FIG. 1 in the case where the current of the current source 2 generates non-uniformity.
Figure 3B:
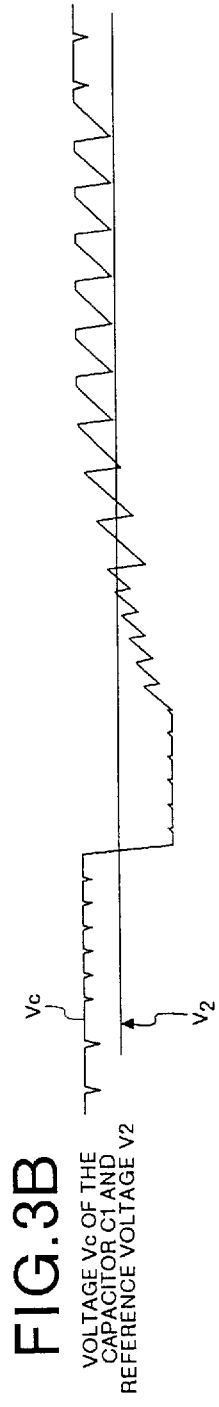
Figure 3C:
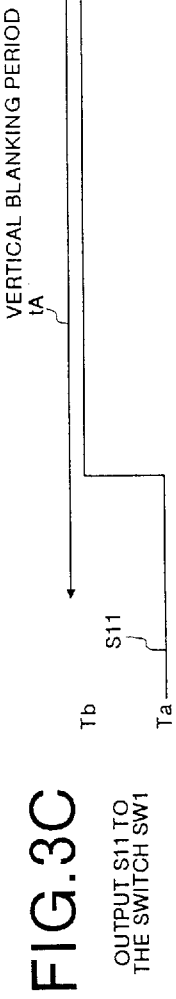
Figure 3D:
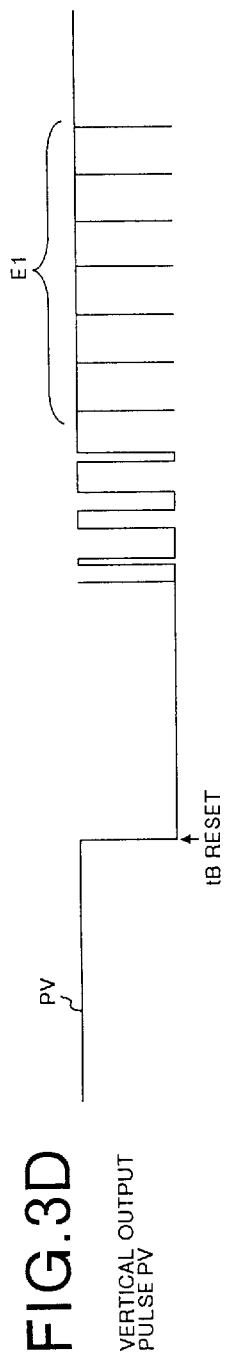

When such non-uniformity in the current value I2 is caused, the detection time of the vertical synchronization that is set at first differs. For example, as shown in FIG. 3B, there is a case in that the voltage Vc of the capacitor C1 is largely vibrated. When the value of the voltage Vc is vibrated, the case to cross the second reference voltage V2 is repeatedly caused. As shown in a region E1 of FIG. 3D, the horizontal synchronization signal is recognized as a vertical output signal.

Then, according to the second embodiment, in a structure of the first embodiment, a switch SW2 connected between the emitters of transistors TR3 and TR4 which constitute a differential pair of the second comparator 12 and a current source 4 is newly provided. The switch control section 32 controls the switch SW1 according to the first embodiment, and at the same time, controls the switch SW2. Other structures are the same as the first embodiment, and the same constituent parts are denoted by the same reference numerals.

The switch control section 32 outputs an output S12 having a waveform shown in FIG. 5D to the switch SW2. This output S12 has a very small pulse width as compared to the pulse width of the horizontal synchronization signal SH. This pulse is a control pulse having a timing that covers at least the pulse of the horizontal synchronization signal SH. The pulse interval becomes a pulse interval of the horizontal synchronization signal SH and is output from the point tB of the reset of the vertical synchronization to the point of the termination of the vertical blanking period tA like the output S11. However, the pulse width of the output S12 refers to the pulse width at the time of off state (at the time of Hi).

When the output S12 is turned off, the current I4 which the current source 4 outputs does not flow. Therefore, the vertical synchronization separation circuit is suspended. Consequently, even when the voltage Vc as shown in FIG. 5B is generated by the non-uniformity in the current I2, the vertical synchronization separation circuit is suspended when the output S12 covering the horizontal synchronization signal SH is turned off. Thus, the horizontal synchronization signal is not recognized as the vertical synchronization signal. Therefore, the double AFC circuit is not suspended, and the circuit is operated in a normal state based on the horizontal synchronization signal.

On the other hand, as shown in FIG. 6A to FIG. 6E, in the case where the horizontal synchronization signal SH to which the copy guard signal CG is added is processed, the vertical output pulse PV is turned off only during the period of the off state of the output S12. The double AFC circuit recognizes the horizontal synchronization signal. Furthermore, the vertical output pulse PV is turned on during the period of on state of the output S12, the operation of the double AFC circuit is suspended, and the AFC voltage is held. Consequently, even in the case where the non-uniformity in the current I2 is generated, the double AFC circuit is not affected by the copy guard signal CG. Therefore, the double AFC circuit can be operated in a normal state immediately after the termination of the vertical blanking period tA, and curve is not caused in the TV screen.

In second embodiment a case is explained in which a control is provided in such a way that the current source 2 is utilized during the period from the reset tB of the vertical synchronization up to the termination of the vertical blanking period tA, and a control is provided so as to apply the control pulse of output S12 during this period. However, it is needless to say that, the current source 2 may be utilized and a control may be provided so as to apply the control pulse of output S12 during this period during any of the periods mentioned below. Namely, from the end of the vertical synchronization signal SV up to the termination of the vertical blanking period tA, from the reset tB of the vertical synchronization up to termination of the copy guard signal CG, or the end of the vertical synchronization signal SV up to the termination of the copy guard signal CG. Further, the control of the switches SW1 and SW2 may be performed discretely in correspondence with these periods.

Further, according to the second embodiment, the switch control section 32, in addition to the control of the switch control section 31 according to the first embodiment, generates an output S12. This output S12 has a very small pulse width as compared to the pulse width of the horizontal synchronization signal SH, and is a control pulse having a timing which covers at least a pulse of the horizontal synchronization signal SH in a pulse interval of the horizontal synchronization signal SH. In the period from the reset tB of the vertical synchronization to the termination of the vertical blanking period tA, a control is further carried out to turnoff the second switch. Consequently, even in the case where the current I2 of the current source 2 becomes non-uniform due to the non-uniformity in the wafer process and the temperature characteristics, the horizontal synchronization signal is not recognized as the vertical synchronization signal. Even in the case where the copy guard signal CG is added, the vertical output pulse PV is turned on during the on period of the output S12. The operation of the AFC circuit is suspended, and the AFC voltage is held with the result that the AFC voltage is not changed or disordered. After the termination of the vertical blanking period tA, the AFC circuit is immediately operated in a normal state, and a curve caused by the copy guard signal CG is not generated in the TV screen output.

As explained above, according to the present invention, the switch control unit changes over the first switch to the third current source during the period from the reset of the vertical synchronization up to the termination of the vertical blanking period decreases the charged current to the capacitor C1. Thereby, the detection time of the vertical synchronization is quickened. Where the copy guard signal is added to the complex synchronization signal, the vertical output pulse is immediately turned on. As a result, the operation of the AFC circuit which generates the horizontal output pulse on the basis of the horizontal synchronization signal is suspended with the turn on of the vertical output pulse PV and the AFC voltage is held. Therefore, even if the copy guard signal is added, the AFC voltage is not changed due to the addition of the copy guard signal, and a disorder is also not caused. After the termination of the vertical blanking period, the AFC circuit is immediately operated in a normal state, and a curve caused by the copy guard signal is not generated in the TV screen output.

According to another aspect of the present invention, the switch control unit generates a control pulse having a timing which covers at least a pulse of the horizontal synchronization signal and has a pulse width which is very small as compared to the pulse width of the horizontal synchronization signal in a pulse interval of the horizontal synchronization signal. The switch control unit further carries out a control for turning off a second switch with the control pulse during a period up to the termination of the vertical blanking period. Consequently, even in the case where the current of the third current source becomes non-uniform due to the non-uniformity in the wafer process and the temperature characteristics, the horizontal synchronization signal is not recognized as the vertical synchronization signal. Therefore, even if the copy guard signal is added, the AFC voltage is not changed due to the addition of the copy guard signal, and a disorder is also not caused. After the termination of the vertical blanking period, the AFC circuit is immediately operated in a normal state, and a curve caused by the copy guard signal is not generated in the TV screen output.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vertical synchronization separation circuit comprising:
    a first comparator of an input complex synchronization signal with a first reference voltage and producing a comparison result, the first comparator including an input side transistor and an output side transistor connected as a differential air;
    a first current source connected to a collector of said output side transistor of the differential pair;
    a second current source commonly connected to an emitter of said input side transistor and an emitter of said output side transistor, said second current source supplying a larger current than the current supplied by said first current source;
    a capacitor charged or discharged depending upon a flow of the current from said first current source in accordance with the comparison result produced by said first comparator;
    a second comparator for comparing an integrated output produced by said capacitor with a second reference voltage;
    a pulse generator generating and outputting a vertical output pulse when the integrated output of said capacitor exceeds the second reference voltage;
    a third current source supplying a current smaller than the current produced by said first current source;
    a first switch switching between said first current source and said third current source and outputting a current to the collector of said output side transistor; and
    a switch control unit controlling said first switch to connect said third current source during a period from resetting of a vertical synchronization signal until completion of a vertical blanking period.

2. The vertical synchronization separation circuit according to claim 1, wherein
    the current from said first current source is controlled so that current flowing to said capacitor during charging is greater than the current flowing from said capacitor during discharging, and
    the current from said third current source is controlled so that the current flowing to said capacitor during charging is less than the current flowing from said capacitor during discharging.

3. The vertical synchronization separation circuit according to claim 1, wherein said switch control unit controls said first switch to connect said third current source at least when the vertical synchronization signal corresponding to the complex synchronization signal ends until the completion of the vertical blanking period.

4. The vertical synchronization separation circuit according to claim 1, wherein said switch control unit controls said first switch to connect said third current source at least when the vertical synchronization signal is reset until termination of a copy guard signal appended to a horizontal synchronization signal corresponding to the complex synchronization signal.

5. The vertical synchronization separation circuit according to claim 1, wherein said switch control unit controls said first switch to connect said third current source at least when the vertical synchronization signal corresponding to the complex synchronization signal ends until termination of a copy guard signal appended to a horizontal synchronization signal corresponding to the complex synchronization signal.

6. The vertical synchronization separation circuit according to claim 1, wherein said second comparator comprises a second pair of transistors connected as a second differential pair and further comprising:
    a second switch connected to an emitter of a transistor of said second differential pair, and wherein
        said switch control unit generates a control pulse having a narrower pulse width than a horizontal synchronization signal and a timing within at least one pulse of the horizontal synchronization signal, in a pulse interval of the horizontal synchronization signal, and
        said switch control unit controls turning off of said second switch in response to the control pulse during a period from the resetting of the vertical synchronization signal until termination of a vertical blanking period.

7. The vertical synchronization separation circuit according to claim 6, wherein said switch control unit generates a control pulse having a narrower pulse width than the horizontal synchronization signal and a timing within at least one pulse of the horizontal synchronization signal, in a pulse interval of the horizontal synchronization signal; and
    controls said second switch to be off using the control pulse at least when the vertical synchronization signal corresponding to the complex synchronization signal ends until the termination of the vertical blanking period.

8. The vertical synchronization separation circuit according to claim 6, wherein said switch control unit controls connection of said first switch to said third current source at least when the vertical synchronization signal is reset until terminal of a copy guard signal appended to the horizontal synchronization signal corresponding to the complex synchronization signal;

generates a control pulse having a narrower pulse width than the horizontal synchronization signal and a timing within at least one pulse of the horizontal synchronization signal, in a pulse interval of the horizontal synchronization signal; and controls said second switch to be off using the control pulse at least when the vertical synchronization signal is reset until termination of the copy guard signal.

9. The vertical synchronization separation circuit according to claim 6, wherein said switch control unit controls connection of said first switch to said third current source at least when the vertical synchronization signal corresponding to a complex guard signal ends until termination of a copy guard signal appended to the horizontal synchronization signal corresponding to the complex synchronization signal;

generates a control pulse having a narrower pulse width than the horizontal synchronization signal and a timing within at least one pulse of the horizontal synchronization signal, in a pulse interval of the horizontal synchronization signal; and controls said second switch to be off using the control pulse at least when the vertical synchronization signal corresponding to the complex synchronization signal ends until termination of the copy guard signal.

* * * * *